(12) United States Patent
Mao et al.

(10) Patent No.: US 11,708,270 B2
(45) Date of Patent: Jul. 25, 2023

(54) CONTROLLED HEIGHT CARBON NANOTUBE ARRAYS

(71) Applicant: JIANGSU CNANO TECHNOLOGY CO., LTD., Jiangsu (CN)

(72) Inventors: Ou Mao, Jiangsu (CN); Anqi Zhao, Jiangsu (CN); Zhaojie Wei, Jiangsu (CN); Meijie Zhang, Jiangsu (CN); Tao Zheng, Brookline, MA (US)

(73) Assignee: JIANGSU CNANO TECHNOLOGY CO., LTD., Jiangsu (CN)

( * ) Notice: Subject to any disclaimer, the term of this patent is extended or adjusted under 35 U.S.C. 154(b) by 483 days.

(21) Appl. No.: 16/635,873

(22) PCT Filed: Jul. 31, 2018

(86) PCT No.: PCT/US2018/044621
§ 371 (c)(1),
(2) Date: Jan. 31, 2020

(87) PCT Pub. No.: WO2019/028036
PCT Pub. Date: Feb. 7, 2019

(65) Prior Publication Data
US 2021/0009421 A1 Jan. 14, 2021

Related U.S. Application Data

(60) Provisional application No. 62/539,055, filed on Jul. 31, 2017.

(51) Int. Cl.
*C01B 32/162* (2017.01)
*B01J 23/745* (2006.01)
(Continued)

(52) U.S. Cl.
CPC .......... *C01B 32/162* (2017.08); *B01J 23/745* (2013.01); *B01J 23/75* (2013.01); *B01J 23/755* (2013.01); *B01J 37/0207* (2013.01); *B82Y 40/00* (2013.01)

(58) Field of Classification Search
CPC . C01B 32/162; C01B 2202/08; C01B 32/158; C01B 32/159; C01B 32/16;
(Continued)

(56) References Cited

U.S. PATENT DOCUMENTS

| 7,923,615 B2 | 4/2011 | Silvy et al. |
| 9,731,277 B2 | 8/2017 | Chan et al. |

(Continued)

FOREIGN PATENT DOCUMENTS

| CN | 1559673 A | 1/2005 | |
| CN | 101073934 | * 11/2007 | ............. B32B 33/00 |

(Continued)

OTHER PUBLICATIONS

Machine Translation of CN 101073934 to Univ Tsinghua (Year: 2007).*

(Continued)

*Primary Examiner* — Daniel C. McCracken
(74) *Attorney, Agent, or Firm* — McDermott Will & Emery LLP

(57) ABSTRACT

Controlled height carbon nanotube arrays including catalysts and synthesis methods relating thereto are disclosed. Such nanotube arrays can be prepared from catalyst particles having an Fe:Co:Ni molar ratio impregnated in an exfoliated layered mineral to grow carbon nanotube arrays where the Fe:Co:Ni molar ratio of the catalyst is used to control the height of the array.

8 Claims, 6 Drawing Sheets

(51) Int. Cl.
  *B01J 23/75* (2006.01)
  *B01J 23/755* (2006.01)
  *B01J 37/02* (2006.01)
  *B82Y 40/00* (2011.01)

(58) Field of Classification Search
  CPC ... C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 23/745; B01J 23/75; B01J 23/755; B01J 37/0207; B01J 21/16; B82Y 40/00; Y02E 60/10; H01M 4/131; H01M 4/525; H01M 4/625; H01M 10/0525; C01P 2006/40; C01P 2004/03; C01P 2004/13; C01P 2004/64; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
  See application file for complete search history.

(56) References Cited

U.S. PATENT DOCUMENTS

| | | |
|---|---|---|
| 10,226,756 B2 | 3/2019 | Chan et al. |
| 2007/0160522 A1 | 7/2007 | Ryu et al. |
| 2008/0206125 A1 | 8/2008 | Silvy |
| 2014/0054513 A1* | 2/2014 | Chan ............ B01J 23/75 252/511 |

FOREIGN PATENT DOCUMENTS

| | | |
|---|---|---|
| CN | 101073934 A | 11/2007 |
| JP | 2009-508667 A | 3/2009 |
| JP | 2009-067675 A | 4/2009 |
| JP | 2014-511754 A | 5/2014 |
| JP | 2015-063462 | 4/2015 |
| KR | 10-2008-0099555 A | 11/2008 |

OTHER PUBLICATIONS

Hoyos-Palacio, et al., Catalystic effect of Fe, Ni, Co and Mo on the CNTs production, IOP Conf. Series: Materials Science and Engineering 2014; 59: 012005, pp. 1-8 (Year: 2014).*

Pastorkova, et al., The growth of multi-walled carbon nanotubes on natural clay minerals (kaolinite, nontronite and sepiolite), Applied Surface Science 2012; 258: 2661-2666 (Year: 2012).*

Moura, et al., Catalytic growth of carbon nanotubes and nanofibers on vermiculite to produce floatable hydrophobic "nanosponges" for oil spill remediation, Applied Catalysis B: Environmental 2009; 90: 436-440 (Year: 2009).*

Zhao, et al., Large scale intercalated growth of short aligned carbon nanotubes among vermiculite layers in a fluidized bed reactor, Journal of Physics and Chemistry of Solids 2010; 71: 624-626 (Year: 2010).*

Mica Powder, accessed online at http://www.ratanmica.com/product/mica-flakepowder/ on Aug. 29, 2022 (Year: 2022).*

Dupuis, The catalyst in the CCVD of carbon nanotubes—a review, Progress in Materials Science 2005; 50: 929-961 (Year: 2005).*

Definition of calcine, accessed online at https://www.merriam-webster.com/dictionary/calcine on Dec. 19, 2022 (Year: 2022).*

Marcos, et al., Exfoliation of vermiculites with chemical treatment using hydrogen perocide and thermal treatment using microwaves, Applied Clay Science 2014; 87: 219-227 (Year: 2014).*

Hillier, et al., On the mechanism of exfoliation of Vermiculite, Clay Minerals 2013; 48: 563-582 (Year: 2013).*

Extended European Search Report dated Feb. 15, 2021 in European Application No. 18841181.3.

International Search Report and Written Opinion dated Dec. 14, 2018 in International Application No. PCT/US2018/044621 (12 pages).

Kovalenko, G. A. et al., "Corundum impregnation conditions for preparing supported Ni catalysts for the synthesis of a uniform layer of carbon nanofibers", Kinetics and Catalysis, vol. 51, Issue 5, pp. 762-770, 2010.

Hoyos-Palacio, L. M. et al., "Catalytic effect of Fe, Ni, Co and Mo on the CNTs production", IOP Conference Series: Materials Science and Engineering, vol. 59, pp. 1-8, 2014.

Chinese Office Action issued in corresponding Chinese Patent Application No. 2018800634357, dated Aug. 17, 2022, with English translation.

Wei-Qiao Deng et al., "A Two-Stage Mechanism of Bimetallic Catalyzed Growth of Single-Walled Carbon Nanotubes", Nano Letters, vol. 4, No. 12, pp. 2331-2335

Notice of Allowance issued in corresponding Japanese Patent Appiication No. 2020-529095, dated Nov. 18, 2022, with English translation.

Chinese Office Action issued in corresponding Chinese Patent Application No. 201880063435.7, dated Jan. 10, 2023, with English translation.

"Non-metallic Mineral and Rock Material Technology", Kuiyi Rong et al., Wuhan University of Technology Press, Jun. 1996, 1st edition, pp. 304-305, published on Jun. 30, 1996.

* cited by examiner

CONTROLLED HEIGHT CARBON NANOTUBE ARRAYS

RELATED APPLICATIONS

The present application is a United States National Phase under 35 U.S.C. § 371 of International Application No. PCT/US2018/044621, entitled "CONTROLLED HEIGHT CARBON NANOTUBE ARRAYS" and filed on Jul. 31, 2018, which claims priority to, and the benefit of, U.S. Provisional Patent Application No. 62/539,055, and filed on Jul. 31, 2017, the entire disclosures of both of which are hereby incorporated by reference herein.

BACKGROUND

The present application relates to carbon nanotube arrays.

Carbon nanotubes are cylindrical nanostructures of carbon. The cylindrical nanostructure may have a single wall or multiple coaxial walls.

Carbon nanotubes may be prepared by several methods including chemical vapor deposition using a metal catalyst deposited on a substrate like silicon wafer or glass in a carbon-rich gas stream. Typically, carbon nanotubes grow along the surface of the substrate because the density of the catalyst is low. Catalytic compositions for synthesis of carbon nanotubes have been reported. See US 2014/0054513. However, the length of the nanotubes and the alignment of the carbon nanotubes can vary significantly across the substrate. Therefore, a method for forming large quantities of long, uniform-height and highly aligned carbon nanotube arrays is needed.

SUMMARY OF THE DISCLOSURE

An advantage of the present disclosure is a process for producing carbon nanotube arrays, including producing such arrays on supported catalysts that can form carbon nanotubes having a length of greater than about 5 microns and a diameter of less than about 100 nanometers.

These and other advantages are satisfied, at least in part, by a method for growing a carbon nanotube array. The method comprises: soaking an exfoliated layered mineral in a metal ion aqueous solution to produce an impregnated layered mineral. The solution can comprises an iron salt, a cobalt salt, and a nickel salt; and the impregnated layered mineral can be calcined to produce a supported catalyst that can be used to grow a carbon nanotube array. Advantageously, such a carbon nanotube array can be long, of uniform-height and the carbon nanotubes highly aligned.

Embodiments of the present disclosure include wherein a molar ratio of iron to cobalt in the metal ion aqueous solution is about 200:1 to about 1:5, a molar ratio of iron to nickel in the metal ion aqueous solution is about 200:1 to about 1:5, and a molar ratio of cobalt to nickel in the metal ion aqueous solution is about 10:1 to about 1:10. In some embodiments, the iron salt, cobalt salt and/or nickel salt can comprise at least one of a: nitrate, chloride, bromide, fluoride, sulfate, or any combination thereof. Other embodiments include, for example, wherein the metal ion aqueous solution further comprises salts of one or more of Mo, W, Al, Mg and combinations thereof such as wherein the metal ion aqueous solution further comprises (i) a salt of Mo or W or a combination thereof and (ii) a salt of Al or Mg or a combination thereof. In some embodiments, the Mo, W, Al, and/or Mg salt are chosen among nitrate salts, chloride salts, bromide salts, fluoride salts, sulfate salts of Mo, W, Al, Mg or any combination thereof.

In practicing certain aspects of the present method, the method can further include oxidizing a layered mineral to produce the exfoliated layered mineral, and/or separating the nanotube array from the supported catalyst. In some embodiments, separating the produced nanotube arrays can be achieved by washing with acid, such as HCl and/or HF, to remove them from the supported catalyst including separating them from platelets and catalyst particles.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to controlled height carbon nanotube arrays including catalysts and synthesis methods relating thereto. More specifically, the embodiments of the present disclosure uses catalyst particles of Fe:Co:Ni impregnated in an exfoliated layered mineral to grow carbon nanotube arrays. The Fe:Co:Ni molar ratio of the catalyst can be used to control the height (i.e., length) of the array. Addition of ions of Mo and/or W and ions of Al and/or Mg or combinations thereof to the catalysts through the metal ion aqueous solution can facilitate growth, length and yield of a carbon nanotube array.

Figure 1:
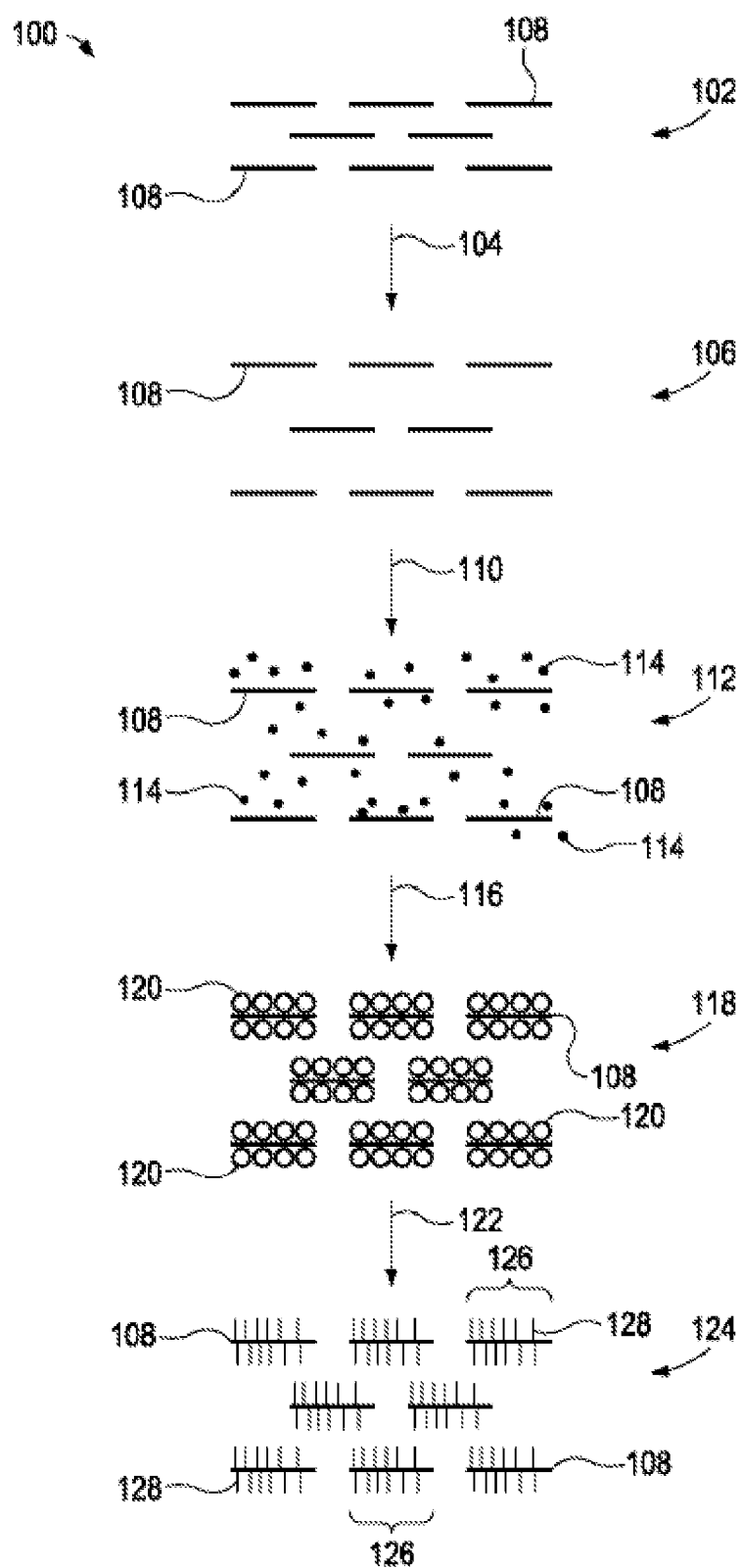
FIG. 1 is an illustrative diagram of at least one embodiment of the present disclosure.

FIG. 1 is an illustrative diagram of at least one embodiment of the present disclosure. A method 100 of producing supported carbon nanotube arrays 126 can begin with exfoliating 104 a layered mineral 102 to produce an exfoliated layered mineral 106. As used herein, the term "layered mineral" refers to mineral having a microstructure of layers platelets 108. Exemplary layered minerals 102 may include, but are not limited to, vermiculite, hydrotalcite, alumina, montmorillonite, kaolinite, mica, and the like, and any combination thereof. As used herein, the term "exfoliate" and related terms relative to layered minerals refers to expansion of the spacing between the platelets 108, which may be achieved, for example, by oxidation or hydration.

In some embodiments, a method can begin with the exfoliated layered mineral 106 when it can be purchased or obtained from other sources.

Impregnation of the exfoliated layered mineral 106 with metal ions 114 can be achieved by soaking 110 the exfoliated layered mineral 106 in an aqueous metal ions solution to produce metal ion impregnated layered minerals 112. The aqueous metal ions solution can include metal salts of iron, nickel, and cobalt where the relative molar ratios of each can be adjusted. Exemplary metal salts can include, but are not limited to, iron (II) nitrate, iron (III) nitrate, iron (II) chloride, iron (III) chloride, iron (II) bromide, iron (III) bromide, iron (II) fluoride, iron (III) fluoride, iron (II) sulfate, iron (III) sulfate, cobalt (II) nitrate, cobalt (II) chloride, cobalt (II) bromide, cobalt (II) fluoride, cobalt (II) sulfate, cobalt (II) sulfate, nickel (II) nitrate, nickel (II) chloride, nickel (II) bromide, nickel (II) fluoride, nickel (II) sulfate, nickel (II) sulfate, and the like, and any combination thereof.

While it is preferable that the molar ratio of Fe:Co:Ni be such that the iron is in the highest molar concentration (e.g., up to 200 times greater than the Co or Ni), in some instances, the Co and/or Ni may be up to 5 times greater than the Fe molar concentration. Therefore, the molar ratio of Fe:Co or Fe:Ni may independently range from about 200:1 to about 1:5. The Co to Ni molar concentrations may preferably be more similar and have a molar ratio ranging from about 10:1 to 1:10. In practicing certain aspects of the present process, the concentration of iron in the aqueous metal ion solution is in the range from 27% to 94%, and the concentration of cobalt and/or nickel is in the range from 2% to 73%.

In addition, other metal ions can be included in the metal ion aqueous solution including salts of Mo or W and salts of Al or Mg or combinations thereof. The addition of salts of Mo, W, Mg and/or Al appear to greatly facilitate growth, length and yield of a carbon nanotube array. Using such salts can facilitate growth of a carbon nanotube array having a height (i.e., length) of greater than 10 microns, greater than about 20 microns, 30 microns, 40 microns and 50 microns in height can be produced. In addition, the catalyst system of the present disclosure can advantageously form small diameter carbon nanotubes, e.g., the nanotube array can have carbon nanotubes with a diameter of less than about 50 nm, 30 nm and less than about 20 nm, such as with a diameter of between 0.5 nm to about 30 nm and between about 0.5 nm to about 20 nm.

It is believed that ions of Mo or W can facilitate formation of smaller catalyst particles and grain sizes, improving the distribution of active sites, which avoids the aggregation of iron, cobalt and nickel. Hence, in an aspect of the present disclosure, a metal ion aqueous solution can comprise an iron salt, a cobalt salt, and/or a nickel salt can further comprise: (i) a salt of Mo or W or a combination thereof and (ii) a salt of Al or Mg or a combination thereof.

Exemplary Mo, W, Al, and Mg salts can include, but are not limited to, nitrate salts, chloride salts, bromide salts, fluoride salts, sulfate salts of Mo, W, Al, Mg or any combination thereof. Salts of Mn, Y, La can be used as well. In certain embodiments, ions of Mo or W can be in the range of 0.5-10% and ions of Mg or Al can be in a range of 2-20% as a weight percent in the final catalyst composition.

Once the metal ion impregnated layered minerals 112 are produced, the method can proceed to calcining 116 the metal ion impregnated layered minerals 112 to produce a supported catalyst 118. The supported catalyst comprises catalyst particles 120 on the platelets 108. In some embodiments, calcining 116 can occur, for example, in an oxygen-containing environment at about 400° C. to about 600° C. for up to a few hours.

The molar ratio of the metal ions, e.g., ions of iron, cobalt, nickel and, if present ions of Mo, W, Al, Mg, in the aqueous metal ions solution generally translates to the molar ratios of the catalyst particles 120.

Then, growing 122 of the carbon nanotube arrays 126 can occur in a carbon-containing gas to produce supported carbon nanotube arrays 124. Generally, the carbon nanotubes 128 grow significantly aligned and perpendicular to the platelets 108 with the height range between 5-100 um and with a diameter of less than about 50 nm.

Because the supported catalyst 118 is a particulate on the macroscopic scale, growing 122 of the carbon nanotube arrays 126 can occur in a fixed bed reactor, a moving fixed bed reactor, a fluidized bed reactor, or the like. Further, the particulate nature of the supported catalyst 118 allows for scaling the method 100 to produce large quantities for tonnage mass production of supported carbon nanotube arrays 124.

Exemplary carbon-containing gases may include, but are not limited to, methane, ethylene, acetylene, and the like, and any combination thereof.

The reaction temperature during growth 122 can range from about 650° C. to about 750° C.

In some embodiments, before and/or after growth 122, the gas environment may be inert (e.g., nitrogen, argon, helium, or the like). In some instances, during growth 122, the inert gas can be used in combination with the carbon-containing gas. In some embodiments, during and/or before growth 122, hydrogen gas may be used to reduce the catalyst from the oxide to the metal. When used during growth 122, the molar ratio of carbon to hydrogen in the gas may be 1:0.1 to 1:0.01. When hydrogen is used before growth 122, the inert gas may be used as a carrier gas.

The carbon nanotube arrays 126 can be separated from the supported catalyst 120. Separating the produced nanotube arrays can be achieved by washing with acid, such as HCl and/or HF, to remove them from the platelets 108 and remove the catalyst 120 from the nanotubes 128. The acid wash can be heated to further facilitate removal of the supported catalyst. The resultant carbon nanotubes can then be washed with water and dried. Carbon nanotubes produced according to the methods of the present disclosure can be used in applications ranging from batteries, fuel cells, super capacitors, conductive plastics, field emission transistors, photovoltaics, and biomedical devices.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1, exfoliating a layered mineral: 50 g of vermiculite was treated for 2 hours at 60° C. in over 30% hydrogen peroxide while stirring. Then, 10 mL of 0.5 M sulfuric acid was added to the sample and refluxed for an hour to produce an oxidize exfoliated vermiculite. Once completed, the vermiculite was washed repeatedly with distilled water until neutral filtrate was produced. Then, the vermiculite was suspended in distilled water and centrifuged at 2500 rpm for 10 minutes. The supernatant was decanted and the oxidized exfoliated vermiculite was dried.

Example 2, preparing supported catalyst. 39.6 g Fe$(NO_3)_3 \cdot 9H_2O$, 0.29 g Co$(NO_3)_2 \cdot 6H_2O$, 0.29 g Ni$(NO_3)_2 \cdot 6H_2O$, and 5.13 g Mg$(NO_3)_2 \cdot 6H_2O$ dissolved in 40 mL of deionized water producing a aqueous nitrate solution with an Fe:Co:Ni molar ratio of 100:1:1. Then, 100 g of oxidized exfoliated vermiculite was added to the aqueous nitrate solution and soaked for 10 hours at 120° C. to produce an impregnated vermiculite. The impregnated vermiculite was then calcined for 2 hours at 400° C. to produce a supported catalyst of the present disclosure.

Figure 2:
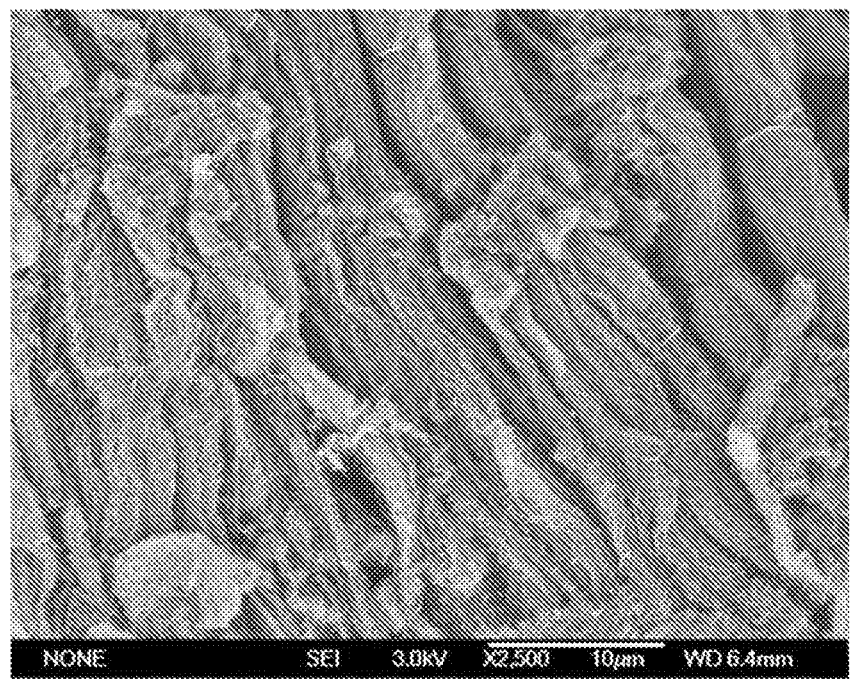
FIG. 2 is a scanning electron micrograph of carbon nanotube arrays produced using supported catalyst 118 according to various embodiments of the present disclosure.

Example 3, synthesizing carbon nanotube array. 1 g of the supported catalyst produced in Example 2 was added to a fixed bed reactor. In a mixture of nitrogen and hydrogen, the reactor was heated to a reaction temperature of 700° C. Then, the supported catalyst was exposed to ethylene for 1 hour at the reaction temperature and finally cooled to room temperature under a nitrogen atmosphere. The resultant carbon nanotube array was about 10 microns in height. FIG. 2 is a scanning electron micrograph of the resultant carbon nanotube array.

Example 4, preparing supported catalyst. 39.6 g Fe$(NO_3)_3 \cdot 9H_2O$, 0.29 g Co$(NO_3)_2 \cdot 6H_2O$, 0.29 g Ni$(NO_3)_2 \cdot 6H_2O$, 10.2 g $(NH_4)_6Mo_7O_{24} \cdot 4H_2O$, and 5.13 g Mg$(NO_3)_2 \cdot 6H_2O$ dissolved in 40 mL of deionized water producing a aqueous nitrate solution with an Fe:Co:Ni molar ratio of 100:1:1. 100 g of oxidized exfoliated vermiculite was added to the aqueous nitrate solution and soaked for 10 hours at 120° C. to produce an impregnated vermiculite. The impregnated vermiculite was then calcined for 2 hours at 400° C. to produce a supported catalyst of the present disclosure.

Figure 3:
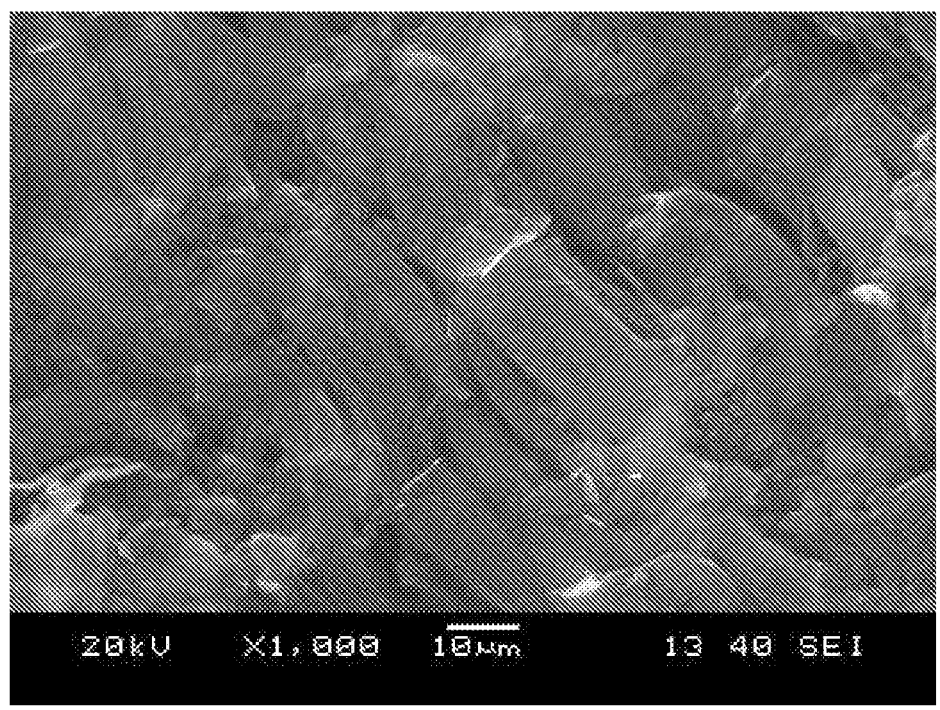
FIG. 3 is a scanning electron micrograph of carbon nanotube arrays produced using supported catalyst 118 according to various embodiments of the present disclosure.

Example 5, synthesizing carbon nanotube array. 1 g of the supported catalyst produced in Example 4 was added to a fixed bed reactor. In a mixture of nitrogen and hydrogen, the reactor was heated to a reaction temperature of 700° C. Then, the supported catalyst was exposed to ethylene for 1 hour at the reaction temperature and finally cooled to room temperature under a nitrogen atmosphere. The resultant carbon nanotube array was about 30 microns in height. FIG. 3 is a scanning electron micrograph of the resultant carbon nanotube array.

Example 6, preparing supported catalyst. 24.2 g Fe$(NO_3)_3 \cdot 9H_2O$, 8.73 g Co$(NO_3)_2 \cdot 6H_2O$, 2.91 g Ni$(NO_3)_2 \cdot 6H_2O$, 37.7 g $(NH_4)_6W_7O_{24} \cdot 4H_2O$, and 5.13 g Mg$(NO_3)_2 \cdot 6H_2O$ dissolved in 40 mL of deionized water producing a aqueous nitrate solution with an Fe:Co:Ni molar ratio of 6:3:1. 100 g of oxidized exfoliated vermiculite was added to the aqueous nitrate solution and soaked for 10 hours at 120° C. to produce an impregnated vermiculite. The impregnated vermiculite was then calcined for 2 hours at 400° C. to produce a supported catalyst of the present disclosure.

Figure 4:
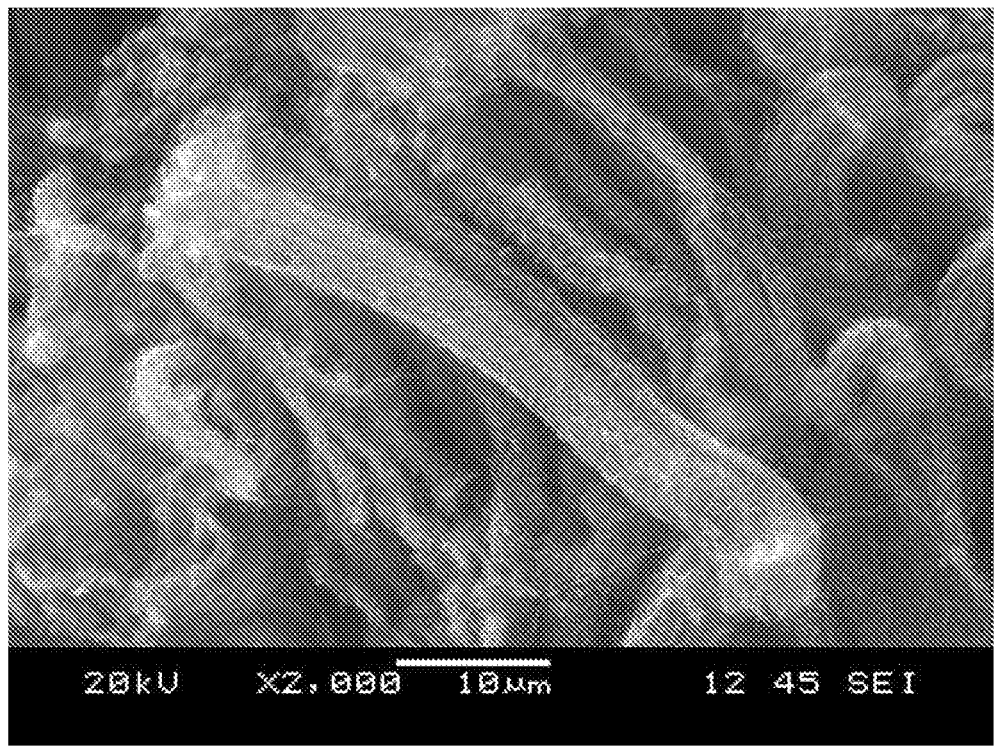
FIG. 4 is a scanning electron micrograph of carbon nanotube arrays produced using supported catalyst 118 according to various embodiments of the present disclosure.

Example 7, synthesizing carbon nanotube array. 1 g of the supported catalyst produced in Example 6 was added to a moving bed reactor. In a mixture of nitrogen and hydrogen, the reactor was heated to a reaction temperature of 700° C. Then, the supported catalyst was exposed to ethylene for 1 hour at the reaction temperature and finally cooled to room temperature under a nitrogen atmosphere. The resultant carbon nanotube array was about 40 microns in height. FIG. 4 is a scanning electron micrograph of the resultant carbon nanotube array.

Example 8, preparing supported catalyst. 24.2 g Fe$(NO_3)_3 \cdot 9H_2O$, 2.91 g Co$(NO_3)_2 \cdot 6H_2O$, 8.73 g Ni$(NO_3)_2 \cdot 6H_2O$, 37.7 g $(NH_4)_6W_7O_{24} \cdot 4H_2O$, and 7.5 g Al$(NO_3)_3 \cdot 6H_2O$ dissolved in 40 mL of deionized water producing a aqueous nitrate solution with an Fe:Co:Ni molar ratio of 2:1:4.3. 100 g of oxidized exfoliated vermiculite was added to the aqueous nitrate solution and soaked for 10 hours at 120° C. to produce an impregnated vermiculite. The impregnated vermiculite was then calcined for 2 hours at 450° C. to produce a supported catalyst of the present disclosure.

Figure 5:
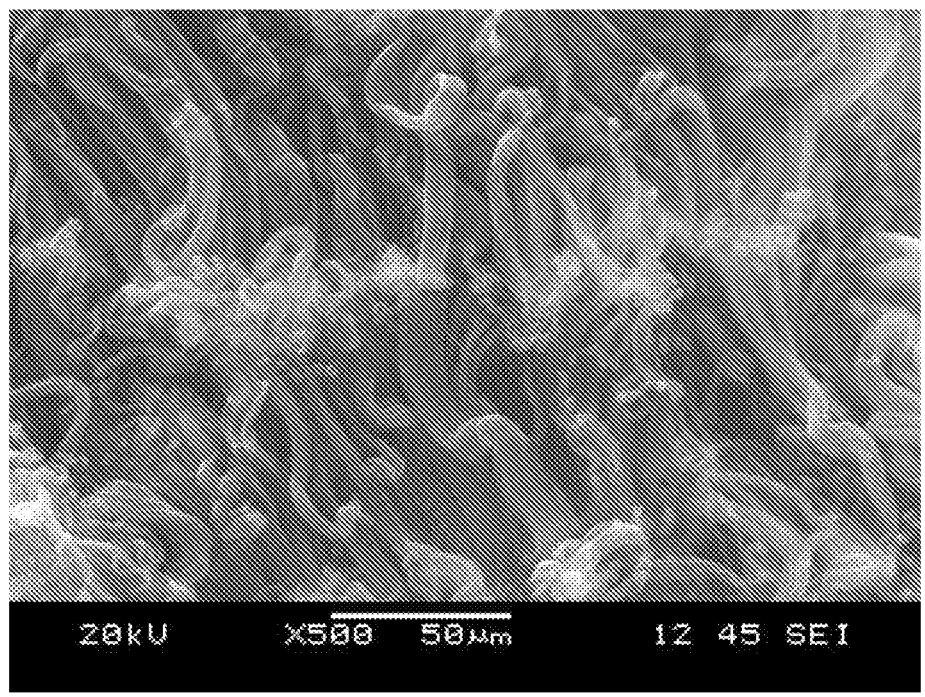
FIG. 5 is a scanning electron micrograph of carbon nanotube arrays produced using supported catalyst 118 according to various embodiments of the present disclosure.

Example 9, synthesizing carbon nanotube array. 1 g of the supported catalyst produced in Example 8 was added to a moving bed reactor. In a mixture of nitrogen and hydrogen, the reactor was heated to a reaction temperature of 700° C. Then, the supported catalyst was exposed to ethylene for 1 hour at the reaction temperature and finally cooled to room temperature under a nitrogen atmosphere. The resultant carbon nanotube array was about 50 microns in height. FIG. 5 is a scanning electron micrograph of the resultant carbon nanotube array.

Example 10, preparing supported catalyst. 32.3 g Fe(NO$_3$)$_3$·9H$_2$O, 2.91 g Co(NO$_3$)$_2$·6H$_2$O, 2.91 g Ni(NO$_3$)$_2$·6H$_2$O, 10.2 g (NH$_4$)$_6$Mo$_7$O$_{24}$·4H$_2$O, and 7.5 g Al(NO$_3$)$_3$·6H$_2$O dissolved in 40 mL of deionized water producing a aqueous nitrate solution with an Fe:Co:Ni molar ratio of 8:1:1. 100 g of oxidized exfoliated vermiculite was added to the aqueous nitrate solution and soaked for 10 hours at 120° C. to produce an impregnated vermiculite. The impregnated vermiculite was then calcined for 2 hours at 450° C. to produce a supported catalyst of the present disclosure.

Figure 6:
FIG. 6 is a scanning electron micrograph of carbon nanotube arrays produced using supported catalyst 118 according to various embodiments of the present disclosure.

Example 11, synthesizing carbon nanotube array. 1 g of the supported catalyst produced in Example 10 was added to a moving bed reactor. In a mixture of nitrogen and hydrogen, the reactor was heated to a reaction temperature of 700° C. Then, the supported catalyst was exposed to ethylene for 1 hour at the reaction temperature and finally cooled to room temperature under a nitrogen atmosphere. The resultant carbon nanotube array was about 60 microns in height. FIG. 6 is a scanning electron micrograph of the resultant carbon nanotube array.

Figure 7:
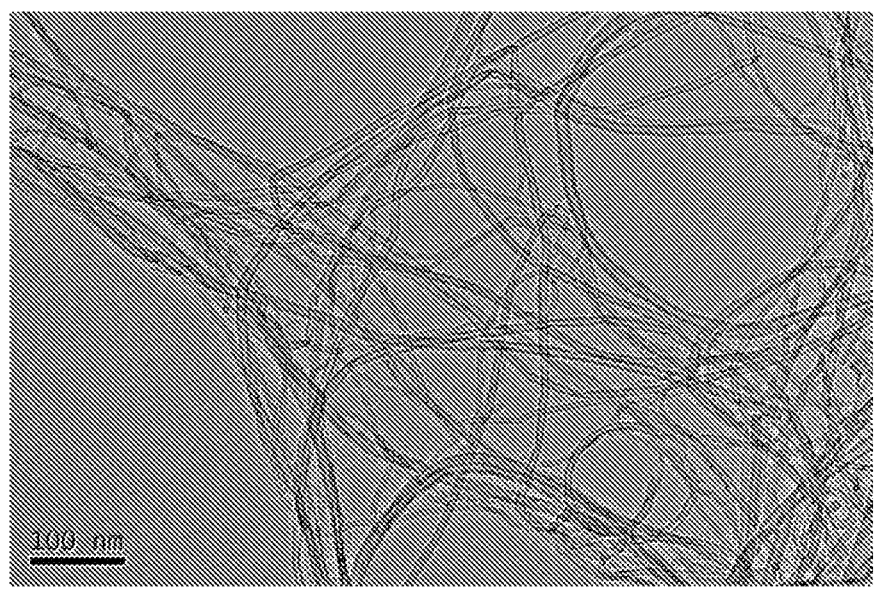
FIG. 7 is a scanning electron micrograph of carbon nanotube arrays produced using supported catalyst 118 according to various embodiments of the present disclosure.
Figure 8:
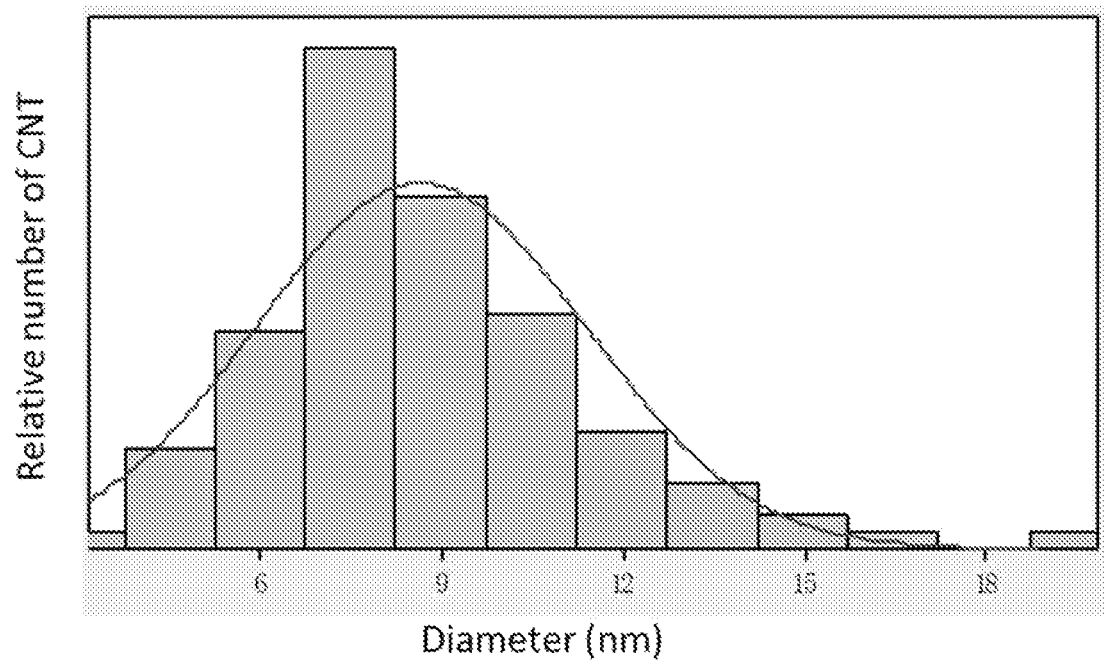
FIG. 8 is a plot showing a diameter distribution analysis of the resultant carbon nanotube with average diameter of 8 nm from Example 12.

Example 12, acid wash to remove the supporting platelets and catalyst. 20 g of the carbon nanotube array in Example 5 was added to 300 g acid solution containing 10% HF and 10% HCl in a polypropylene container and was heated to 80° C. After soaking for 2 hours, the array was wash with purified water until a pH of the solution was over 6. Most of the water was then removed by centrifugation followed by drying in an oven at 120° C. for 8 hours. The resultant carbon nanotube powder was tested to have ash content of 1.35%, while the carbon nanotube array in Example 5 had an ash content of 10.1%. FIG. 7 is a transmission electron micrograph of the resultant carbon nanotube. FIG. 8 is the diameter distribution analysis of the resultant carbon nanotube with average diameter of 8 nm.

Example 13, Dispersion of carbon nanotubes. In a 1-liter beakers, 5 grams of poly(vinylpyrrolidone) (PVP) was dissolved in 500 grams n-methyl-pyrrolidone (NMP) and 20 grams of carbon nanotubes (CNT) in Example 12 were placed in the solution. The final nanotube content was 4% and ratio of CNT/PVP was 4/1. After being agitated for an hour, the mixture was transferred to a colloid mill and ground at a speed of 3000 RPM. A test sample was taken out every 30-minute for evaluation. Viscosity was taken at 25.degree. C. using Brookfield viscometer for each sample. Hegman scale reading was taken simultaneously and illustrated. Maximum dispersion was observed after milling for 180 minutes. The fineness of this paste reached better than 10 micrometer after 120 minutes of milling.

Figure 9:
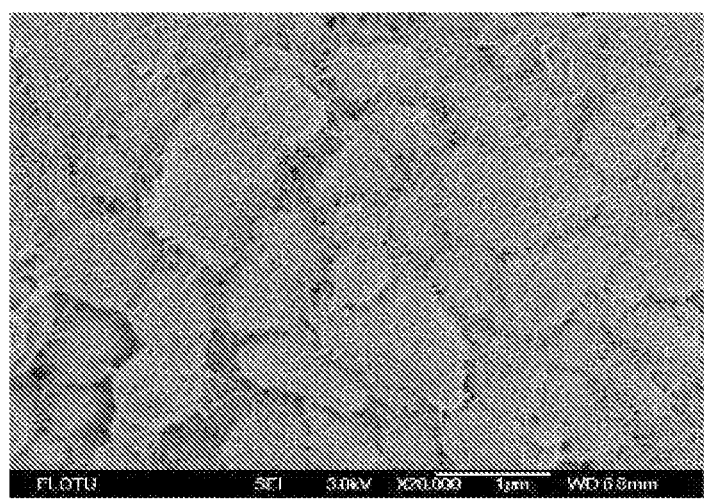
FIG. 9 is a scanning electron micrograph showing a conductive network formed by CNT coating on NCM particles.

Example 14, Conductive additive to the lithium ion battery cathode. The dispersed carbon nanotube paste in Example 13 was used to make a Lithium-ion cathode electrode. Li(NiCoMn)O2 mixed metal oxide (NCM) was used as cathode material. The cathode slurry containing NCM, carbon nanotube, PVP, and polyvinylidene difluoride (PVDF) were prepared by mixing appropriate amounts of NCM, carbon nanotube paste and PVDF together with n-methylpyrrolidone in a high speed mixer. Coating of such slurry was made on an Al foil using a doctor blade followed by drying and compression. FIG. 9 shows a conductive network formed by CNT coating on NCM particles observed under scanning electron microscope (SEM).

As a comparison, an electrode was prepared using Super-P carbon black (CB) to replace CNT in a similar fashion as described before. The composition and bulk resistivity of the two battery electrodes were summarized in the following table. Clearly, CNT-added electrode has much lower bulk resistivity than carbon black modified sample with the same concentration. TABLE 1 lists the compositions and the electrode volume resistivity for both the carbon nanotube and carbon black.

TABLE 1

Cathode electrode of carbon nanotube and carbon black as conductive additive

| Content | Carbon Nanotube | Carbon Black | FT9100 carbon nanotube |
|---|---|---|---|
| NCM | 98.5% | 96% | 98.1% |
| Carbon additive | 0.4% | 2% | 0.75 |
| PVP | 0.1% | | 0.15 |
| PVDF | 1% | 2% | 1% |
| Volume Resistivity | 19 Ω-cm | 18 Ω-cm | 24.8 |

Figure 10:
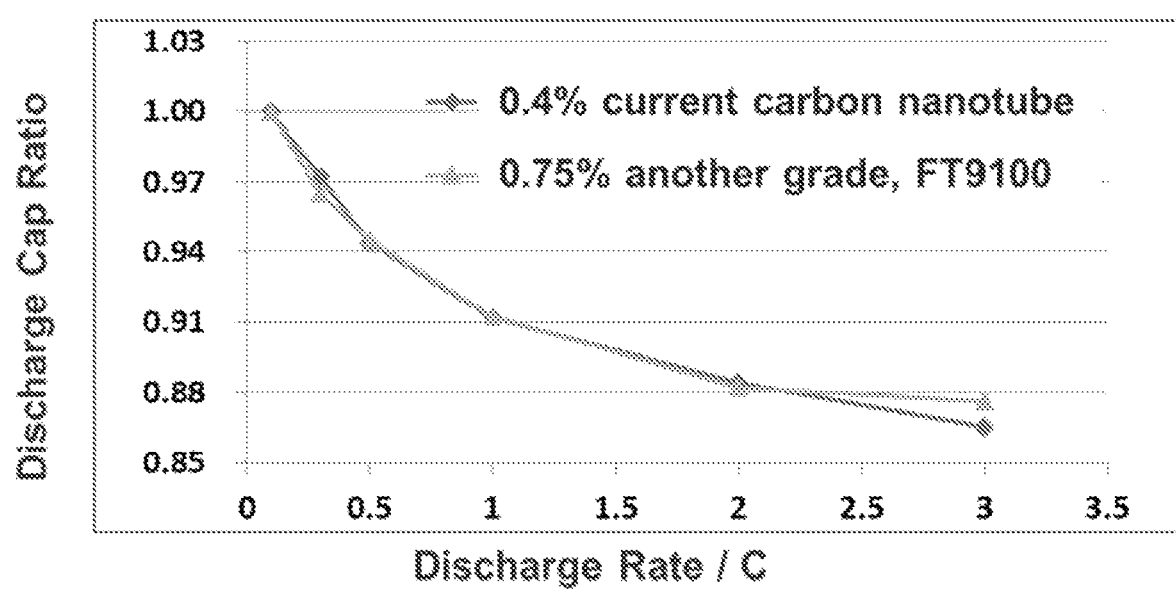
FIG. 10 is a plot of discharge capacity retention under different rate.

Example 15, Performance of carbon nanotube containing Li-ion battery. The carbon nanotube containing cathode electrode in Example 14 and Lithium foil as anode were used to make a Lithium-ion coin battery. As a comparison, another grade of carbon nanotube, FT9100, was dispersed the similar way as described in Example 13. TABLE 1 lists the compositions and the electrode volume resistivity for the both grades of carbon nanotubes. The capacity and cycle life was evaluated at 25.degree. C. The charge and discharge cycles under different speed were illustrated in FIG. 10. The CNT-modified battery exhibited better performance in term of charge capacity and stability.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method for growing a carbon nanotube array, the method comprising:
oxidizing a layered mineral to produce an exfoliated layered mineral;
soaking the exfoliated layered mineral in a metal ion aqueous solution comprising an iron salt, a cobalt salt, and a nickel salt to produce an impregnated layered mineral;
calcining the impregnated layered mineral to produce a supported catalyst; and
growing a carbon nanotube array on the supported catalyst,
wherein the metal ion aqueous solution further comprises: (i) a salt of Mo or W or a combination thereof and (ii) a salt of Al or Mg or a combination thereof.

2. The method of claim 1, wherein a molar ratio of iron to cobalt in the metal ion aqueous solution is about 200:1 to about 1:5, a molar ratio of iron to nickel in the metal ion aqueous solution is about 200:1 to about 1:5, and a molar ratio of cobalt to nickel in the metal ion aqueous solution is about 10:1 to about 1:10.

3. The method of claim 1, wherein the iron salt comprises at least one selected from the group consisting of: iron (II) nitrate, iron (III) nitrate, iron (II) chloride, iron (III) chloride, iron (II) bromide, iron (III) bromide, iron (II) fluoride, iron (III) fluoride, iron (II) sulfate, iron (III) sulfate, and any combination thereof.

4. The method of claim 1, wherein the cobalt salt comprises at least one selected from the group consisting of: cobalt (II) nitrate, cobalt (II) chloride, cobalt (II) bromide, cobalt (II) fluoride, cobalt (II) sulfate, and any combination thereof.

5. The method of claim 1, wherein the nickel salt comprises at least one selected from the group consisting of: nickel (II) nitrate, nickel (II) chloride, nickel (II) bromide, nickel (II) fluoride, nickel (II) sulfate, and any combination thereof.

6. The method of claim 1, wherein the salts of one or more of Mo, W, Al, Mg are chosen among nitrate salts, chloride salts, bromide salts, fluoride salts, sulfate salts of Mo, W, Al, Mg or any combination thereof.

7. The method of claim 1, further comprising: separating the nanotube array from the supported catalyst.

8. The method of claim 1, wherein ions of Mo or W are in a range of 0.5-10 wt. % and ions of Mg or Al are in a range of 2-20 wt. % of the supported catalyst.

* * * * *